(12) United States Patent
Jurek

(10) Patent No.: US 7,132,857 B2
(45) Date of Patent: Nov. 7, 2006

(54) HIGH SPEED RECEIVER WITH WIDE INPUT VOLTAGE RANGE

(75) Inventor: Kevin Joseph Jurek, Gilbert, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 516 days.

(21) Appl. No.: 10/436,737

(22) Filed: May 14, 2003

(65) Prior Publication Data

US 2004/0229591 A1 Nov. 18, 2004

(51) Int. Cl.
*H03K 19/0175* (2006.01)
*H03K 19/094* (2006.01)
*H03K 19/20* (2006.01)
*H03K 19/086* (2006.01)

(52) U.S. Cl. ............ 326/82; 326/83; 326/86; 326/87; 326/90; 326/127

(58) Field of Classification Search ............ 326/82–83, 326/86–87, 90, 127
See application file for complete search history.

(56) References Cited

U.S. PATENT DOCUMENTS

| | | | | |
|---|---|---|---|---|
| 4,795,923 A | * | 1/1989 | Dobos | 327/280 |
| 4,866,314 A | * | 9/1989 | Traa | 327/278 |
| 5,089,789 A | * | 2/1992 | Van Tran | 330/253 |
| 5,945,863 A | * | 8/1999 | Coy | 327/280 |
| 6,177,822 B1 | * | 1/2001 | Okuyama | 327/251 |
| 6,320,406 B1 | * | 11/2001 | Morgan et al. | 326/14 |
| 6,338,144 B1 | * | 1/2002 | Doblar et al. | 713/400 |
| 6,856,169 B1 | * | 2/2005 | Frans et al. | 326/82 |
| 6,870,391 B1 | * | 3/2005 | Sharpe-Geisler | 326/37 |
| 6,911,871 B1 | * | 6/2005 | Li et al. | 331/57 |

OTHER PUBLICATIONS

Micrel Datasheet, '3.3V, 2.5Gbps Any Input-to-LVPECL Dual Translator'—'SuperLite™ SY55857L Final', Rev.: B, Amendment:/0, Issue Date: Mar. 2003.

* cited by examiner

*Primary Examiner*—Rexford Barnie
*Assistant Examiner*—Jason Crawford
(74) *Attorney, Agent, or Firm*—Robert F. Hightower

(57) ABSTRACT

A receiver circuit (12) includes a first gate (24) that receives an input signal ($V_{IN0}$, $V_{IN1}$) and has an output (32, 34) for providing an output signal ($V_{G0}$, $V_{G1}$). A shifting circuit (20) is coupled for shifting the common mode potential of the input signal to produce a shifted signal ($V_{SH0}$, $V_{SH1}$). A second gate (22) has an input (27, 28) that receives the shifted signal and an output coupled to the output of the first gate.

20 Claims, 4 Drawing Sheets

HIGH SPEED RECEIVER WITH WIDE INPUT VOLTAGE RANGE

BACKGROUND OF THE INVENTION

The present invention relates to semiconductor devices and, more particularly, to high speed circuits for receiving logic signals of multiple logic families.

Many electronic systems are implemented using integrated circuits of different logic families. For example, computer systems often use complementary metal-oxide-semiconductor (CMOS) circuits to perform computational functions, low voltage differential signaling (LVDS) circuits for disk drive data signals, and positive emitter-coupled logic (PECL) circuits for clock drivers. These logic circuits are typically incompatible with each other in the sense that voltage levels specified for circuits of one logic family do not fall within the voltage range specified for circuits of a different logic family. Hence, data is lost or noise immunity is substantially impaired. For this reason, a receiver-translator circuit often is used to translate between signals of different logic families.

Most previous receivers are configured to receive signals of only one logic family, so systems must utilize a different translator for each combination of distinct logic families. The result is a higher system cost because of the need to inventory multiple translators and, since fewer translators of each type are used, the lack of economies of scale.

Other previous translators receive signals from multiple logic families. While these devices operate at a high speed for signals from at least one logic family, their specified common mode input voltage range is limited, which results in a significant speed reduction for signals whose common mode levels fall outside the specified range.

Hence, there is a need for a receiver-translator circuit that can receive signals operating over a wider common mode range while maintaining a high speed operation regardless of the common mode levels of the incoming logic signals.

DETAILED DESCRIPTION OF THE DRAWINGS

In the figures, elements having the same reference numbers have similar functionality. Transistors are formed with conduction electrodes that provide the primary current path through the transistor, and control electrodes that control the conduction of the current path. For example, the conduction electrodes of bipolar transistors typically are its emitter and collector, while the control electrode typically is its base. For field effect transistors, the conduction electrodes typically are its source and drain, while the control electrode typically is its gate.

Figure 1:
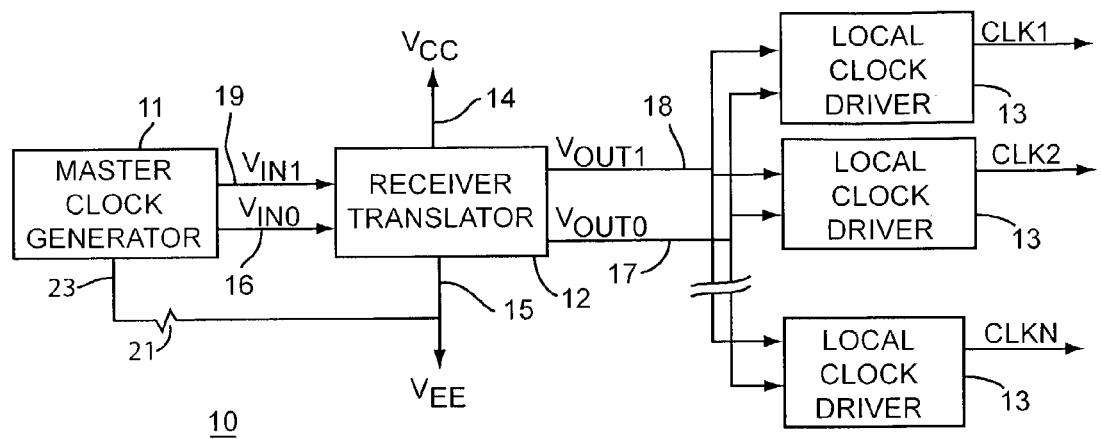
FIG. 1 is a block diagram of a clock distribution network.

FIG. 1 is a block diagram of a clock distribution system 10 for a networked computer system, including a master clock generator 11, a receiver translator 12 and a plurality of N local clock drivers 13, where N is an integer. In one embodiment, master clock generator 11 and receiver translator 12 are located on a circuit card in a central computing unit while local clock drivers 13 are located either on other circuit cards or at remote locations of the networked computer system.

Master clock generator 11 includes an oscillator that produces a master clock signal MCLK containing differential component signals $V_{IN0}$ and $V_{IN1}$ transmitted across a two wire bus consisting of lines 16 and 19. $V_{IN0}$ and $V_{IN1}$ operate at levels specified for a low voltage differential signaling (LVDS) logic family whose peak to peak voltage swing ranges between plus and minus two hundred fifty millivolts and plus and minus four hundred fifty millivolts. $V_{IN0}$ and $V_{IN1}$ operate with a common mode voltage that ranges between 1.125 volts and 1.375 volts. Hence, $V_{IN0}$ and $V_{IN1}$ may each undergo an overall voltage excursion in a range between about 900 millivolts and about 1.6 volts. Alternatively, $V_{IN0}$ and $V_{IN1}$ may be provided at levels compatible with low voltage or standard complementary metal-oxide-semiconductor (CMOS), emitter coupled logic (ECL), positive emitter coupled logic (PECL), current mode logic (CML), high speed transistor logic (HSTL) or any of several other logic families. As yet a further alternative, the master clock signal may operate as a single-ended rather than a differential clock signal. In one embodiment, $V_{IN0}$ and $V_{IN1}$ pulses are generated at a clock frequency of at least 2.5 gigahertz.

Note that the common mode level of component signals $V_{IN0}$ and $V_{IN1}$ at master clock generator 11 may differ from its level at receiver translator 12 because of ground loops or differences in local ground potentials that are represented schematically by a resistor 21. In effect, the ground loops result in the reference potential of a local ground node 23 of master clock generator 11 being different from that of a lead 15 of receiver translator 12 operating as its reference potential. This potential difference can be on the order of plus or minus several hundred millivolts, and often is not constant. If $V_{IN0}$ and $V_{IN1}$ are referenced to a node 23 potential that is lower than that of lead 15, then $V_{IN0}$ and $V_{IN1}$ may be received by receiver translator 12 with a common mode level lower than specified. This problem is particularly characteristic of HSTL signals because they operate at even lower voltage levels than LVDS signals. For example, to receive HSTL signals while maintaining the noise immunity specified for the HSTL logic family, receiver circuits operate with an input common mode voltage between 0.68 volts and 0.9 volts, with a differential signal amplitude of about four hundred millivolts peak to peak. On the other hand, if node 23 has a higher potential than lead 23, $V_{IN0}$ and $V_{IN1}$ may be received by receiver translator 12 at a common mode voltage level higher than the specified level. These differences in the reference level can be difficult to predict until a system is operating, and underscore the practical benefit of a receiver with a wide common mode input voltage range.

Receiver translator 12 receives component signals $V_{IN0}$ and $V_{IN1}$ to produce a differential output signal on nodes 17–18 whose components are respectively designated as output signals $V_{OUT0}$ and $V_{OUT1}$. In one embodiment, nodes 17–18 are configured as a terminated differential pair transmission line with $V_{OUT1}$ and $V_{OUT0}$ operating at standard ECL logic levels. In one embodiment, receiver translator 12 operates between a supply voltage $V_{CC}$=3.3 volts, received at a lead 14, and a supply voltage $V_{EE}$ of zero volts, received at a lead 15.

Local clock drivers 13 are configured as standard CMOS drivers that $V_{OUT0}$ and $V_{OUT1}$ may be capacitively coupled to local clock drivers 13. Local clock drivers 13 produce a plurality of local clock signals CLK1, CLK2, . . . , CLKN.

Figure 2:
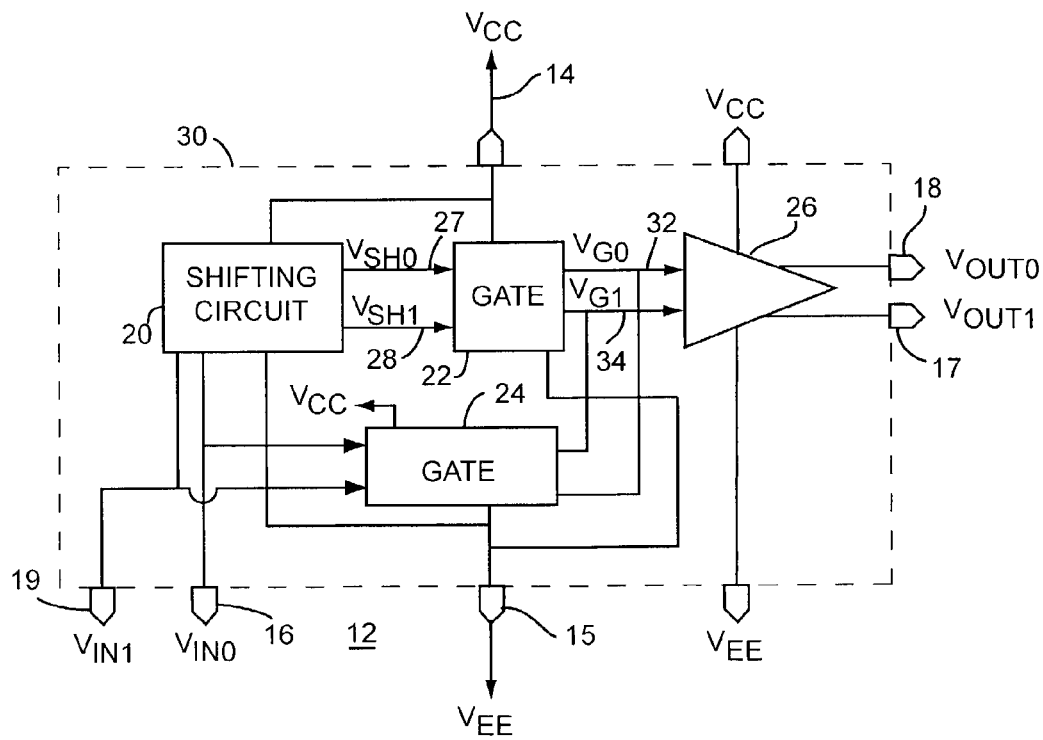
FIG. 2 is a block diagram of a receiver translator.

FIG. 2 is a block diagram showing receiver translator 12 in further detail, including a common mode shifting circuit 20, gates 22 and 24 and an output buffer 26, all of which are formed on a semiconductor die housed in a package 30. Component signals $V_{IN0}$ and $V_{IN1}$ are received on leads 16 and 19, respectively, and output signals $V_{OUT0}$ and $V_{OUT1}$ are provided on leads 17–18, respectively.

Gates 22 and 24 typically include a differential transistor pair configured as a differential amplifier with a structure and operation similar to the structure and operation of a standard ECL gate. The collectors of the respective differential transistors are commonly coupled in a wired OR arrangement to nodes 32 and 34 to produce output signals $V_{G0}$ and $V_{G1}$, respectively, for driving output buffer 26.

Gates 22 and 24 operate at either a high speed or a low speed, depending on the common mode voltage level at the inputs of the gates. High speed operation occurs if the input signal's common mode voltage is greater than about 0.6 volts above the level of $V_{EE}$ at 25° Celsius. For example, ECL signals have a common mode potential of about one volt below $V_{CC}$, or about 2.3 volts greater than $V_{EE}$, and therefore are processed at a high speed. At lower common mode voltages, the switching speed, propagation delay and/or maximum operating frequency may be reduced significantly. For example, LVDS signals have a common mode potential of about 1.25 volts above $V_{EE}$, and therefore would be processed by a standard gate only at a low speed.

Shifting circuit 20 includes a network that shifts $V_{IN0}$ and $V_{IN1}$ in order to apply a signal at the input of gate 22 that has a common mode level different from that of the signal applied to gate 24. The result of shifting is two shifted signals $V_{SH0}$ and $V_{SH1}$ provided on nodes 27 and 28. In one embodiment, shifting circuit 20 includes a voltage shifting network that shifts $V_{IN0}$ and $V_{IN1}$ positively toward supply voltage $V_{CC}$ in order to provide high speed shifting for signals from logic families operating near supply voltage $V_{EE}$, such as HSTL and LVDS. Alternatively, shifting circuit 20 is formed to shift $V_{IN0}$ and $V_{IN1}$ negatively toward $V_{EE}$ to accommodate input signals operating at or slightly above $V_{CC}$.

Output buffer 26 is typically configured as a standard ECL output driver stage capable of driving differential output signals $V_{OUT0}$ and $V_{OUT1}$ into a fifty ohm transmission line load referenced to a potential about two volts more negative than $V_{CC}$.

Figure 3:
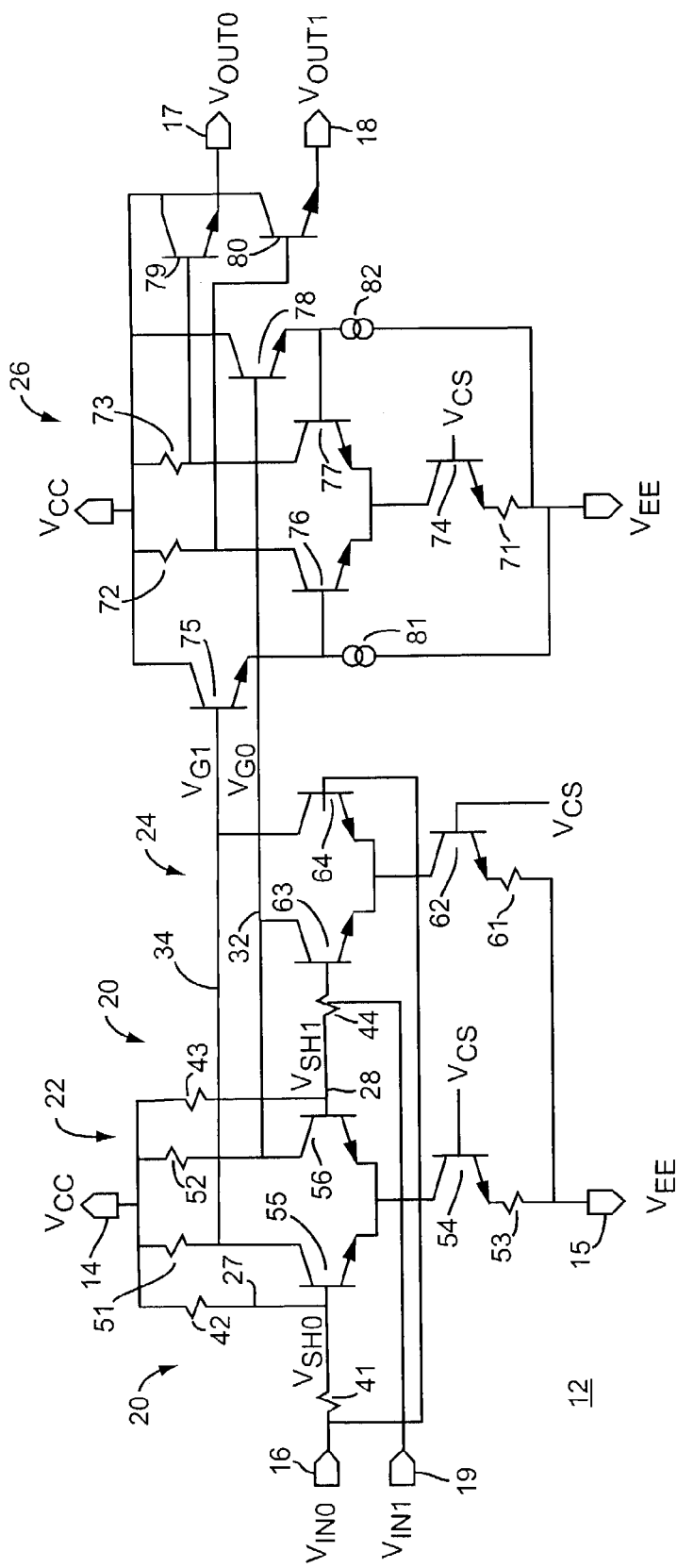
FIG. 3 is a schematic diagram showing the receiver translator in further detail.

FIG. 3 is a schematic diagram showing receiver translator 12 in detail. Gate 22 includes resistors 51–53 and NPN bipolar transistors 54–56. Gate 24 includes resistor 61 and NPN bipolar transistors 63–64. Output buffer 26 includes resistors 71–73, NPN bipolar transistors 74–80 and current sources 81–82. Shifting circuit 20 includes resistors 41–44. Receiver translator 12 preferably is formed with bipolar transistors due to their low noise, high gain, excellent matching and high speed operation. Preferably, the transistors are NPN transistors because their frequency response is higher than that for PNP transistors. However, field effect transistors (FETS) such as junction FETs or metal-oxide-semiconductor FETs could alternatively be used for low speed and low power applications.

Gate 24 is configured as a standard ECL gate in which transistors 55–56 operate as a differential amplifier loaded by resistors 51–52. Resistor 53 and transistor 54 operate as a current source supplying a bias current determined by the level of a bias voltage $V_{CS}$ an the resistance of resistor 53. In one embodiment, transistor 54 supplies a bias current of about one milliampere. $V_{CS}$ typically has a value in a range between about 1.0 and 1.2 volts above supply voltage $V_{EE}$ at 25° Celsius. Although shown and described as processing a differential signal with component signals $V_{IN0}$ and $V_{IN1}$, gate 24 can alternatively be formed to process single ended signals by biasing the base of either transistor 63 or 64 to a fixed bias potential.

Transistor 54 supplies a substantially constant current of about one milliampere in the unsaturated mode. The practical point of saturation occurs when its collector operates at a potential of about four hundred millivolts lower than its base, at which point its supplied current, and therefore the speed of gate 24, decreases. Assuming the base-emitter voltage of transistors 55 and/or 56 is about eight hundred millivolts and $V_{CS}$ operates at about 1.2 volts, saturation of transistor 54 typically occurs during a logic transition when $V_{IN0}=V_{IN1}=1.6$ volts or less. Hence, gate 24 operates at its full rated speed for input signals having a common mode level greater than about 1.6 volts. For lower level signals, such as HSTL and LVDS signals, the speed degrades.

Gate 22 has a similar configuration and operation as gate 24, with transistors 63–64 operating as a differential amplifier similar to transistors 55–56. Transistor 62 and resistor 61 function as a current source similar to the current source provided by transistor 54 and resistor 53. The collectors of transistors 55–56 are commonly coupled at nodes 32 and 34 to the collectors of the gate 24 differential amplifier in a wired OR/NOR fashion, with resistors 51–52 providing common loads. Hence, currents routed through transistors 55 and 64 in response to are summed at node 34 to develop signal $V_{G1}$, and currents routed through transistors 56 and 63 are summed at node 34 to develop signal $V_{G0}$. As a result of this configuration, voltages $V_{G0}$ and $V_{G1}$ make their logic transitions in response to whichever gate, 22 or 24, has the shortest delay after transitions of input component signals $V_{IN0}$ and $V_{IN1}$.

Shifting circuit 20 comprises a voltage divider consisting of resistors 41–42 and a voltage divider consisting of resistors 43–44. These voltage dividers receive $V_{IN0}$ and $V_{IN1}$ and increase the common mode or DC voltage level on the bases of transistors 55–56 to produce shifted signals $V_{SH0}$ and $V_{SH1}$ that extend the overall input common mode range of receiver translator 12. The common mode voltage $V_{CM}$ at leads 16 and 19 occurs during a logic transition when $V_{CM}=V_{IN0}=V_{IN1}$. At that point, the voltages $V_{27}$ and $V_{28}$ on nodes 27 and 28 are given by the equation $$V_{27} = V_{28} = V_{CM} + (V_{CC} - V_{CM})\frac{R_{41}}{R_{41} + R_{42}},$$

where $R_{41}$ and $R_{42}$ are the resistances of resistors 41 and 42, respectively. In one embodiment, $R_{41}=R_{42}=1.0$ kilohms, so that $V_{27}=V_{28}=(V_{CC}-V_{EE})/2$ even if $V_{CM}=V_{IN0}=V_{IN1}=V_{EE}$ or zero volts. Hence, if $V_{CC}=3.3$ volts, $V_{27}$ and $V_{28}$ are centered at about 1.65 volts even if $V_{IN0}$ and $V_{IN1}$ are centered at $V_{EE}$, i.e., ground potential. Hence, even though the propagation delay of gate 24 may be degraded, transistor 54 does not saturate and gate 22 continues to operate at a high speed.

Note that as common mode voltage $V_{CM}$ approaches $V_{CC}$, gate 22 begins to slow down because resistors 41 and 44 tend to reduce the base currents of transistors 55 and 56. On the other hand, gate 24, which has no resistors in the bases of its differential transistors 63 and 64, continues to run at full speed.

The increase in the common mode voltages on nodes 27 and 28 due to the voltage division operation of resistors 41–44 is referred to herein as voltage shifting, in contrast with level shifting, because the differential mode swing of $V_{SH0}$ and $V_{SH1}$ is proportionately reduced from the swing of $V_{IN0}$ and $V_{IN1}$. Level shifting would result in virtually no differential mode signal reduction. For example, if $R_{41}=R_{42}$ and $V_{IN0}$ and $V_{IN1}$ have peak to peak voltage swings of two hundred millivolts, the peak to peak differential swing of shifted signals $V_{SH0}$ and $V_{SH1}$ on nodes 27–28 is only one hundred millivolts. This typically is not considered a problem because differential amplifiers have a high gain and excellent matching of transistors 55–56 and 63–64 can be obtained on a semiconductor die. Moreover, by using bipolar transistors to configure the differential amplifiers, a lower noise and higher transconductance is achieved than what is practical with other types of devices. Such bipolar transistors typically result in the accurate resolution of differential signals of fifty millivolts or less.

Output buffer 26 is configured as a standard ECL output buffer/driver, including resistors 71–73, transistors 74–80 and current sources 81–82.

Transistor 74 and resistor 71 comprise a current source that supplies a bias current from the collector of transistor 74 to the emitters of transistors 76–77. In one embodiment, the bias current is set to be about five milliamperes.

Transistors 75 and 78 operate as emitter follower devices biased with about one milliampere each from current sources 81–82, respectively. The logic states represented by signals $V_{G0}$ and $V_{G1}$ are transferred to the bases of transistors 76–77 through the emitters of transistors 75 and 78 respectively.

Transistors 76–77 operate as a differential amplifier that steers the bias current supplied by transistor 74 through resistors 72–73 to develop a differential amplified signal that is buffered by transistors 79–80 to drive leads 17–18 with complementary signals $V_{OUT0}$ and $V_{OUT1}$, respectively.

Figure 4:
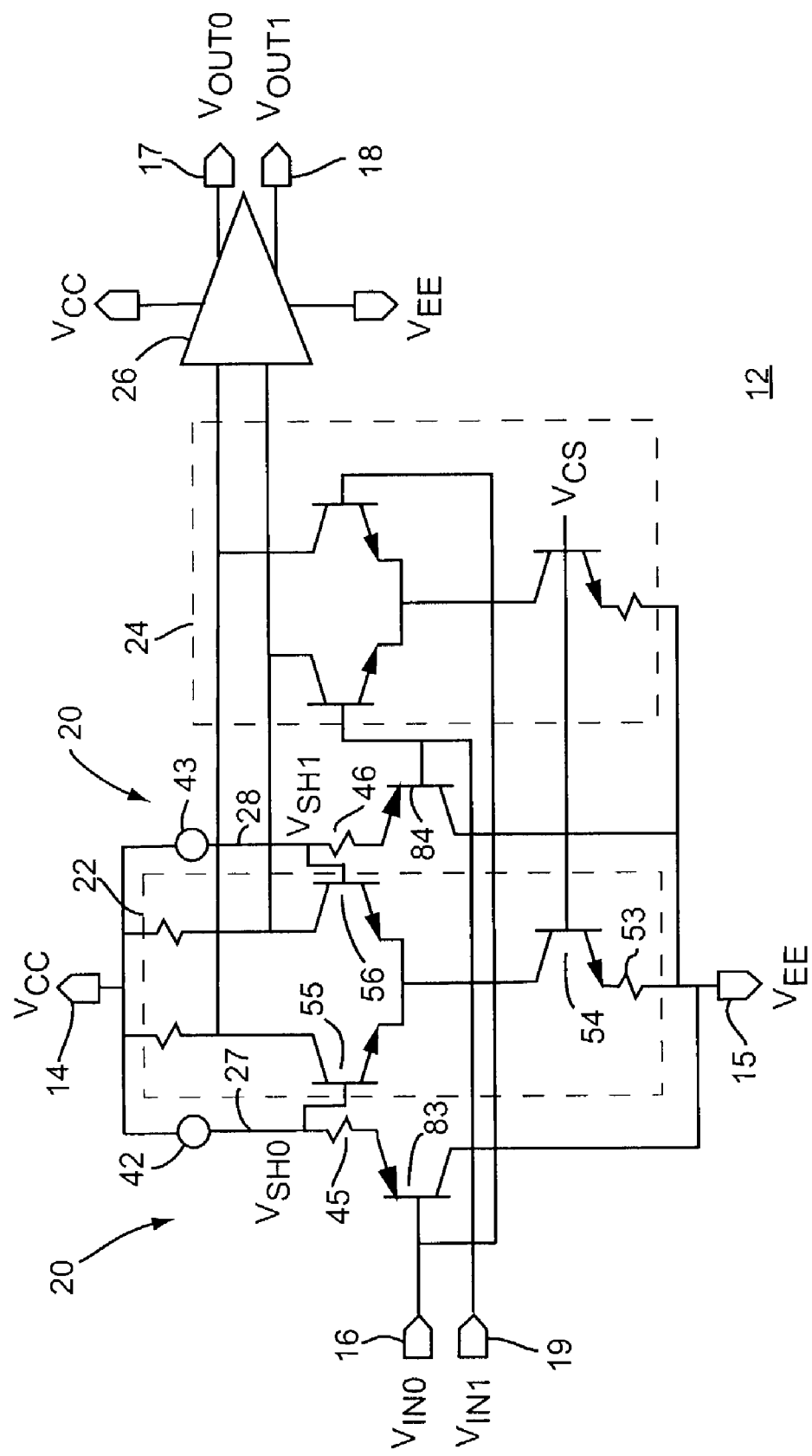
FIG. 4 is a circuit diagram of the receiver translator in an alternate embodiment.

FIG. 4 is a schematic diagram of receiver translator 12 in an alternate embodiment. The structure and operation are similar to the embodiment of FIG. 3, except that resistors 41 and 44 of shifting circuit 20 are replaced with PNP bipolar transistors 83–84 operating as emitter followers as shown, and current sources 42–43 and resistors 45–46 are added. Current sources 42–43 are matched in order to supply constant, equal currents from $V_{CC}$ through, and equal voltage drops across, resistors 45–46. The voltage drops have predefined values that typically range from about fifty millivolts to about four hundred millivolts each, although other suitable magnitudes also may be used for particular applications. In this embodiment, shifting circuit 20 operates as a level shifter that level shifts $V_{IN0}$ and $V_{IN1}$ through the base-emitter junction of transistors 83–84 and resistors 45–46 to produce shifted voltages $V_{SH0}$ and $V_{SH1}$ on nodes 27 and 28, respectively, as level shifted signals. In one embodiment, resistors 45–46 are omitted, so $V_{LS0}$ and $V_{LS1}$ are about 0.8 volts more positive than $V_{IN0}$ and $V_{IN1}$, and the common mode input voltage level below which transistor 54 saturates and the speed of gate 22 degrades is about 0.8 volts above supply voltage $V_{EE}$. Hence, receiver translator 12 operates at a high speed for signals whose common mode ranges from about 0.8 volts above supply voltage $V_{EE}$ to about the level of supply voltage $V_{CC}$. Alternatively, the amount of level shifting can be modified by modifying the currents supplied by current sources 42–43 or the resistances of resistors 45–46. Such modifications result in varying the input common mode voltage range to suit particular system requirements. Moreover, by level shifting rather than voltage shifting, the full differential signal level is applied across the bases of transistors, thereby providing a higher noise immunity to low amplitude signals such as those from the LVDS and HSTL logic families. Since the currents flowing through resistors 45–46 is constant, no significant reduction in the differential signal levels of shifted signals $V_{SH0}$ and $V_{SH1}$ occurs.

Figure 5:
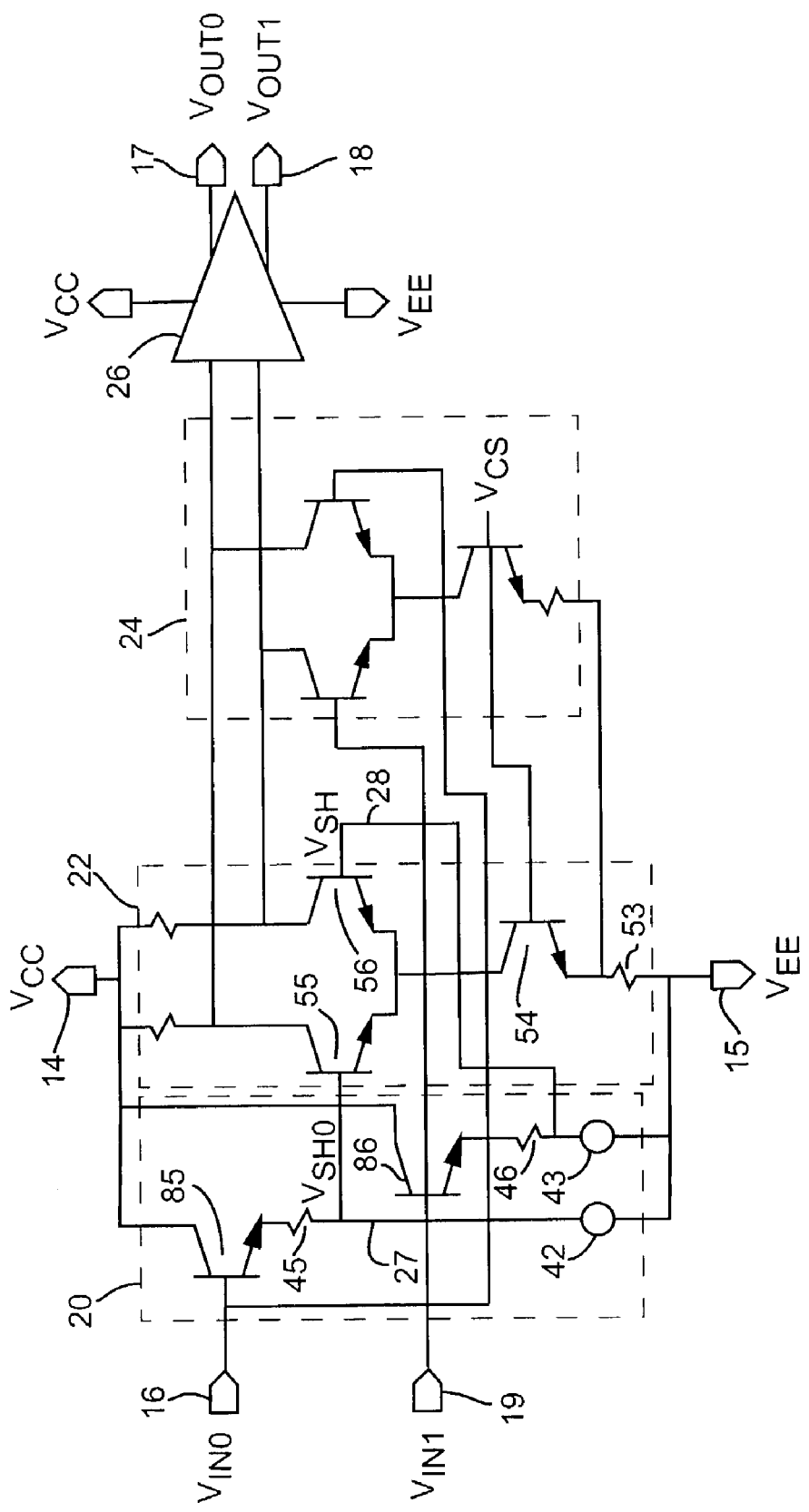
FIG. 5 is a circuit diagram of the receiver translator in another alternate embodiment.

FIG. 5 is a schematic diagram of receiver translator 12 in another alternate embodiment. The structure and operation are similar to the embodiment of FIG. 4, except that PNP transistors 83–84 of shifting circuit 20 are replaced with NPN bipolar transistors 85–86 and current sources 42–43 supply current from $V_{EE}$ instead of $V_{CC}$. Transistors 85–86 and resistors 45–46 operate as level shifters that level shift $V_{IN0}$ and $V_{IN1}$ to produce shifted voltages $V_{SH0}$ and $V_{SH1}$ on nodes 27 and 28, respectively, as level shifted voltages. Resistors 45–46 may be omitted, in which case $V_{LS0}$ and $V_{LS1}$ are about 0.8 volts more negative than $V_{IN0}$ and $V_{IN1}$, which increases by about 0.8 volts the common mode input voltage level above which transistors 55 and/or 56 saturate and the speed of gate 22 degrades. Hence, receiver translator 12 operates at a high speed for signals whose common mode ranges from about 1.6 volts above supply voltage $V_{EE}$ to a level about 0.8 volts more positive than supply voltage $V_{CC}$. The level shifting results in the full $V_{IN0}$ and $V_{IN1}$ differential signal being applied across the bases of transistors 55–56 to provide a high noise immunity to CML and other signals operating near the $V_{CC}$ level.

In summary, the present invention provides a receiver translator circuit with a high speed and noise immunity and an extended common mode input voltage range that is suitable for receiving and processing signals from a multiplicity of logic families. A first gate has an input that receives an input signal and an output that provides an output signal. A shifting circuit either voltage shifts or level shifts the common mode potential of the input signal to produce a shifted signal. A second gate has an input for receiving the shifted signal and an output coupled to the output of the first gate. The extension of the common mode input voltage range allows the receiver translator to process signals from a wider variety of logic families while maintaining the high operating speed of the receiver translator. The receiver translator circuit is shown and described with bipolar transistors, field-effect transistors could be used instead of some or all of the bipolar transistors, while maintaining a wide common mode input voltage range.

The invention claimed is:

1. A receiver circuit, comprising;
   a first gate having an input for receiving an input signal and an output for providing an output signal;
   a shifting circuit coupled for shifting a common mode potential of the input signal by a substantially constant value to produce a shifted signal; and
   a second gate having an input for receiving the shifted signal and an output coupled to the output of the first gate.

2. The receiver circuit of claim 1, wherein the input signal is a differential input signal and the first gate includes a first differential amplifier having first and second inputs for receiving the first input signal.

3. The receiver circuit of claim 2, wherein the second gate includes a second differential amplifier having first and second inputs coupled to an output of the shifting circuit.

4. The receiver circuit of claim 1, wherein the shifting circuit includes a voltage divider coupled between the input of the first gate and a supply voltage for producing the shifted signal at the input of the second gate.

5. The receiver circuit of claim 4, wherein the voltage divider includes:

a first resistor coupled between the inputs of the first and second gates; and a second resistor coupled between the input of the second gate and the supply voltage.

6. The receiver circuit of claim 1, wherein the shifting circuit includes:

a transistor having a control electrode coupled to the input of the first gate and a conduction electrode coupled to the input of the second gate.

7. The receiver circuit of claim 6, further including a resistor coupled between the conduction electrode of the transistor and the input of the second gate for developing a voltage drop that establishes an amount of level shifting between the inputs of the first and second gates.

8. The receiver circuit of claim 6, wherein the transistor is formed as a PNP bipolar transistor with a base coupled to the input of the first gate and an emitter coupled to the input of the second gate.

9. The receiver circuit of claim 6, wherein the transistor comprises a field-effect transistor having a gate electrode coupled to the input of the first gate and a source coupled to the input of the second gate.

10. The receiver circuit of claim 1, further comprising an output buffer having an input coupled to the output of the first gate and an output for providing the output signal.

11. The receiver of claim 10, wherein the output buffer produces the output signal with first and second differential components operating at ECL voltage levels.

12. The receiver of claim 1, further comprising a semiconductor package for housing the first and second gates and the shifting circuit.

13. A receiver circuit, comprising:

a first differential amplifier having an input for receiving an input signal;

a second differential amplifier having an output coupled to an output of the first differential amplifier for providing a translated signal wherein the output of the first differential amplifier is coupled to operate in phase with the output of the second differential amplifier, the second differential amplifier including an input; and a shifter circuit coupled to the input of the first differential amplifier for shifting a common mode potential of the input signal to produce a non-inverted shifted signal at the input of the second differential amplifier.

14. The receiver circuit of claim 13, wherein the first and second differential amplifiers include first and second pairs of bipolar transistors.

15. The receiver circuit of claim 14, wherein the first and second pairs of bipolar transistors are formed as first and second pairs of field effect transistors.

16. The receiver circuit of claim 13, wherein the shifter circuit includes:

a first resistor coupled between the inputs of the first and second differential amplifiers; and a second resistor coupled from the input of the second differential amplifier to a supply lead of the receiver circuit.

17. A method of translating an input signal of a first logic family to an output signal of a second logic family, comprising:

amplifying the input signal to produce a first current at a first node;

shifting a common mode potential of the input signal by a substantially constant amount to produce a shifted signal; and amplifying the shifted signal to produce a second current at the first node for summing with the first current to produce the output signal.

18. The method circuit of claim 17, wherein amplifying the input signal includes amplifying the input signal with a first differential amplifier.

19. The method circuit of claim 17, wherein amplifying the shifted signal includes amplifying the shifted signal with a second differential amplifier.

20. The translator circuit of claim 17, wherein shifting includes voltage dividing the input signal to alter a common mode voltage of the input signal.

* * * * *